Patented Jan. 16, 1951

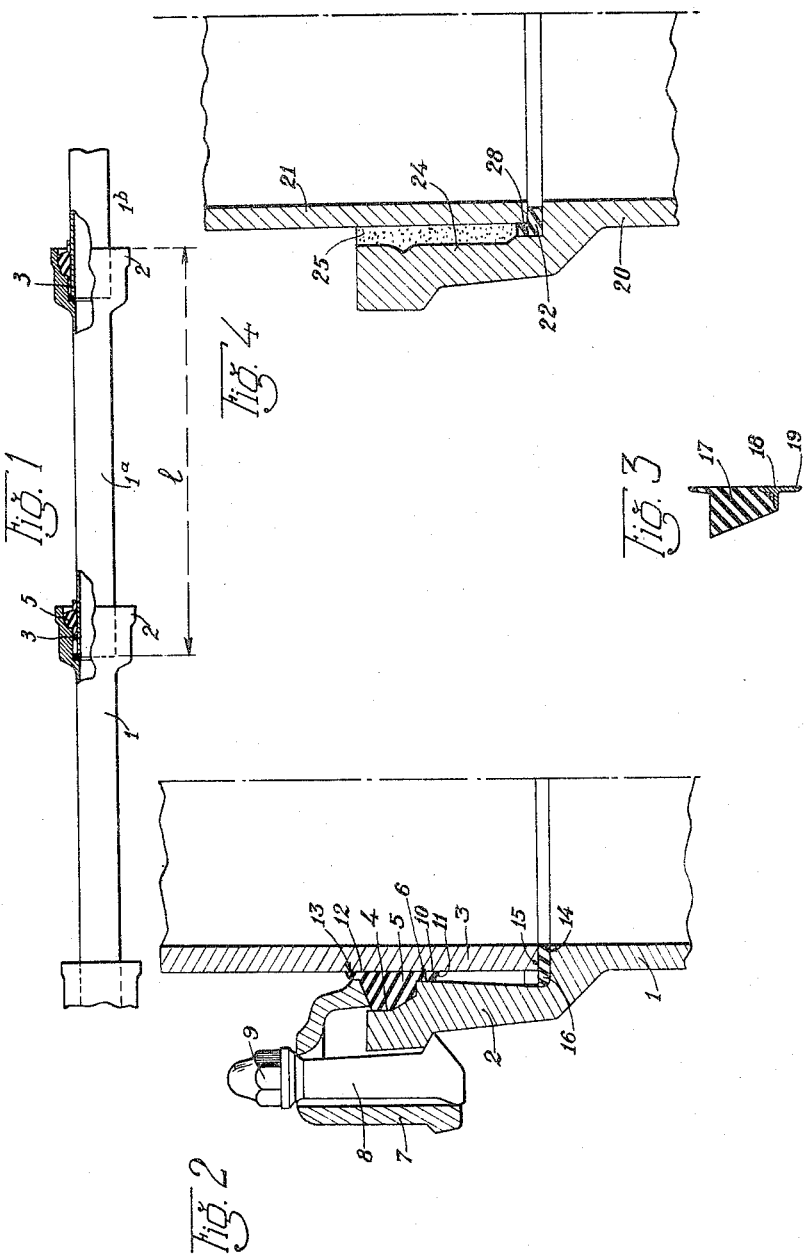

2,538,186

UNITED STATES PATENT OFFICE 2,538,186

INSULATED JOINT FOR BELL AND SPIGOT PIPES

Jacques Boucher, Paris, France, assignor to Compagnie de Pont-a-Mousson, Nancy, France, a French company Application August 12, 1948, Serial No. 43,928
In France January 27, 1948

1 Claim. (Cl. 285—115)

Metal pipes which are buried near an electric railway are often affected by a so-called stray current from the return circuit. This return current ought normally to follow the rail. If the rail is not a perfect conductor, a portion of the current is dispersed in the ground, in the form of a stray current which preferably follows the buried conducting elements, such as metal pipes.

Since it is generally a direct current, an electrolytic reaction occurs at the points where the current leaves the pipe, owing to the presence of the mineral salts with which the ground is impregnated and consequently a chemical attack of the metal occurs. This phenomenon may cause a comparatively rapid deterioration of the pipe, particularly when it is made of a metal such as steel which is particularly sensitive to corrosion.

It is therefore necessary to protect pipes which are exposed to stray currents from this action. Various methods have already been proposed for this purpose, but they are of very variable efficiency and some are even sometimes harmful. Thus:

The application of a protecting insulating covering may cause, at the points where even an insignificant local crack occurs in said covering, a heavy current concentration and an accelerated attack of the piping;

The method known by the name of cathode protection, which comprises artificially discharging the pipe in a controllable manner at predetermined points, requires a detailed study of the circulation of the currents, an expensive and delicate apparatus and continual supervision;

Finally the known use of simple insulating breaks at several points of the piping which are carefully selected and spaced fairly far apart from one another, for example at distances of the order of one or several hundreds of metres, also requires a previous study and assumes, in order that such breaks may be useful, that the conditions of flow of the current remain stable in time; furthermore, owing to the great length of the successive conducting sections, the potential difference on either side of each joint is considerable, of the order for example of several volts, so that the flow of current across said insulating breaks can only be prevented or considerably attenuated at the price of careful insulation and an additional insulation of the pipe over a certain length before and after said breaks.

The present invention has for its object to provide a method for protecting buried metal pipes from stray electric currents, which enables the above mentioned drawbacks to be overcome.

Said method comprises systematically interposing insulating joints all along the piping, at short intervals of the order of ten metres, so that the potential difference produced along the piping between two points of said piping which are located on either side of an insulating joint, owing to the potential field that exists in the ground and that produces stray currents, is lower than the counter-electromotive force which is developed between the said elements and the ground which is made a conductor by the mineral salts which are dissolved therein, when a current flows which tends to pass round the joint.

The invention also has for its object to provide joints for piping, intended for the application of said method and the piping comprising such joints.

Other features will become apparent from the ensuing description.

In the accompanying drawing which is given solely by way of example:

Fig. 1 shows diagrammatically an elevational view with parts broken away, of a piping with insulating joints according to the invention;

Fig. 2 shows a longitudinal half-section of an insuating joint according to the invention, of the compressed washer and clamping collar type;

Fig. 3 shows a section of a modification of the insulating washer for pipes for town gas or hydrocarbons;

Fig. 4 shows a longitudinal half-section of another modification of insulating joint applicable to cast joints.

According to the embodiment shown in Figs. 1 and 2, the piping is formed of useful pipes 1, 1ª, 1ᵇ of a length l of four to eight metres for example. Each of said pipes is provided with a bell 2 in which penetrates the cylindrical spigot 3 of the adjacent pipe such as 1ª. In the bell 2 is provided from the free end to the bottom a housing 4 for a washer 5 of rubber or like elastic material, a bearing surface 6 for centring the pipe 3 and a frusto-conical surface the diameter of which increases towards the bottom of the bell to enable slight angular deflections of one pipe relatively to the other. A clamping collar 7, held by bolts 8 with nuts 9 is pressed against the washer 5 which it keeps in a compressed state. The face 10 of said washer 5 in contact with the spigot 3 of the pipe 1ª is extended by two circular tongues 11 and 12 of trapezoidal cross-section. The tongue 11 is inserted between the centring surface 6 and the spigot of the tube $1^a$ and the tongue 12 between the inner side face 13 of the clamping collar 7 and said spigot. Between the end edge 14 of the spigot of the pipe $1^a$ and the bottom 15 of the bell is provided a free space which can be filled by means of a thin slab 16 of tarred wood or any other insulating material.

When the joint described is made, said free space or the plate 16 insulates the bottom 15 of the bell from the edge 14 of the spigot of the pipe $1^a$. On the other hand, the tongues 11 and 12 respectively insulate said spigot from the centring surface 6 and from the face 13 of the clamping collar 7. A complete electric insulation is thus obtained between the body of one of the pipes ($1^a$) and the bell-clamping collar assembly of the other pipe (1) and consequently stray currents are prevented from flowing through the piping by way of the successive conducting elements of said piping.

It might be imagined, however, that such stray currents flow round each insulating joint by passing through the ground which is always slightly conducting. But in this case an electrolysis reaction occurs at the inlet and outlet points of the current between the mechanical elements of the piping and the ground which is rendered conducting by the mineral salts dissolved therein, said electrolytic reaction producing a counter-electromotive force which tends to prevent the flow of said stray current.

Assume that:

E is the potential difference that exists in the ground between two points of the piping $n$ times the length of a pipe apart;

$n$ the number of insulating joints between said two points;

$e$ the counter-electromotive force which is developed at each joint between the elements of the piping and the ground; and R the contour resistance of each insulating joint;

Then the value of the intensity $i$ of the current which tends to flow through the piping can be expressed by:

$$i = \frac{E - ne}{nR}$$

($E - ne$) tends towards zero when the number $n$ of joints increases and

R simultaneously increases proportionally to the number of joints.

For these two reasons, the intensity $i$ of the current flowing through the piping very rapidly decreases. Therefore, if according to the invention, an insulating joint is formed between the successive pipes, the potential difference produced by the stray current which rarely exceeds 10 volts per kilometre is reduced, for a pipe 6 metres long, to $$\frac{10 \times 6}{1000} = 60 \text{ millivolts}$$

This potential difference is very much smaller than the counter-electromotive force $e$ which may easily attain several tenths of a volt and, consequently, owing to the invention, the flow of the stray current through the piping is absolutely stopped, which is not the case with the known breaks which are spaced a long distance apart (several hundreds of metres) and for which the potential difference between two consecutive joints is substantially greater than the aforesaid counter-electromotive force.

In the case in which the piping contains a fluid which is liable to attack rubber (for example town gas or hydrocarbons), the insulating joint should be made so as to be unattackable by said fluid.

This result may be obtained by using a one-piece washer with its tongues 11 and 12 as hereinbefore described, made of a material which is refractory to said fluid; thus use may be made of one of the synthetic rubbers comprising copolymers derived from butadiene such as those that can now be found on the market and which produce, after vulcanization, a product which is refractory to the fluid, or again, any other synthetic plastic material or any other insulating material which is not attacked by the aforesaid fluid.

Another solution may comprise using a washer of rubber or other attackable elastic material, combined with a separate unattackable ring which is adapted to cover the entire surface of the washer liable to be in contact with the fluid.

Thus, the separate ring may be formed by a thioplastic material preferably covered with carbon black or any other like product.

Fig. 3 shows for example a modification of a washer 17 provided on its face which is intended to come into contact with the attacking fluid with a protecting ring 18 for the rubber. Said ring, the radial cross-section of which is T-shaped, forms a tongue 19 which replaces the tongue 11 of the previous example. It may be formed of any of the materials which have just been mentioned.

Fig. 4 shows a second modification of an insulating joint of a type applicable to the piping elements 20, 21 for cast joints. According to this modification, a circular cap 22 of rubber or any other insulating material of L-shaped cross-section is arranged round the spigot of the pipe 21 and separates it from the centring surface 23 left inside the bell 24 of the pipe 20. Said cap 22 is intended to ensure the electric insulation between the pipe 21 and the bearing surface 23 and replaces the flattened cord of an ordinary cast joint. The joint product 25 which is poured between the bell of the pipe 20 and the spigot of pipe 21 is a fusible insulating material for example the one containing sulphur and known by the registered trade-mark "Thiolit" of the French company: Compagnie de Pont-à-Mousson.

Of course, the invention is in no way limited to the insulating joints and types of insulating joints hereinbefore described which have only been given by way of example. Thus, the joints with a tongue of the type shown in Fig. 1 may be in one piece or may be formed of a plurality of independent elements, each of said elements being secured or not to one of the elements to be joined or to one of the compression members, and being placed in position separately or not.

Having now described my invention what I claim as new and desire to secure by Letters Patent is:

An underground insulating joint for bell and spigot pipe comprising a bell section for receiving the spigot end of a pipe, said bell section having a recessed first shoulder adjacent its open end, and a frusto-conical recess extending inwardly of said shoulder the diameter of said recess increasing towards the bottom of the bell, said recess forming a second shoulder with the body of the pipe; an insulating washer seated on said second shoulder; a spigot portion extending into said second recess and being spaced from the body of the bell, the end of said spigot portion resting on said insulating washer; an insulating packing seated in said first recess and engaging the wall of the spigot, said packing having tongues extending along said wall from opposite faces of said packing; a clamping collar on said bell and engaging said packing, and means connecting said collar and bell for pressing said collar against said packing to force same into said first recess between said bell and spigot, said collar being spaced from said spigot by the outermost tongue of said packing, the innermost tongue extending partially into said frusto-conical recess and spacing said spigot from the wall of said recess, the remaining portion of said frusto-conical recess being free of packing, the end of said spigot being free to oscillate slightly in the free, enlarged portion of said frusto-conical recess.

JACQUES BOUCHER.

REFERENCES CITED

The following references are of record in the file of this patent:

UNITED STATES PATENTS

| Number | Name | Date |
|---|---|---|
| 364,947 | Moore | June 14, 1887 |
| 634,848 | Courson | Oct. 10, 1899 |
| 753,595 | Learned | Mar. 1, 1904 |
| 763,542 | Crawford et al. | June 28, 1904 |
| 1,277,976 | Mann | Sept. 3, 1918 |
| 1,986,357 | Perry | Jan. 1, 1935 |
| 2,272,811 | Nathan | Feb. 10, 1942 |